Patented Apr. 9, 1929.

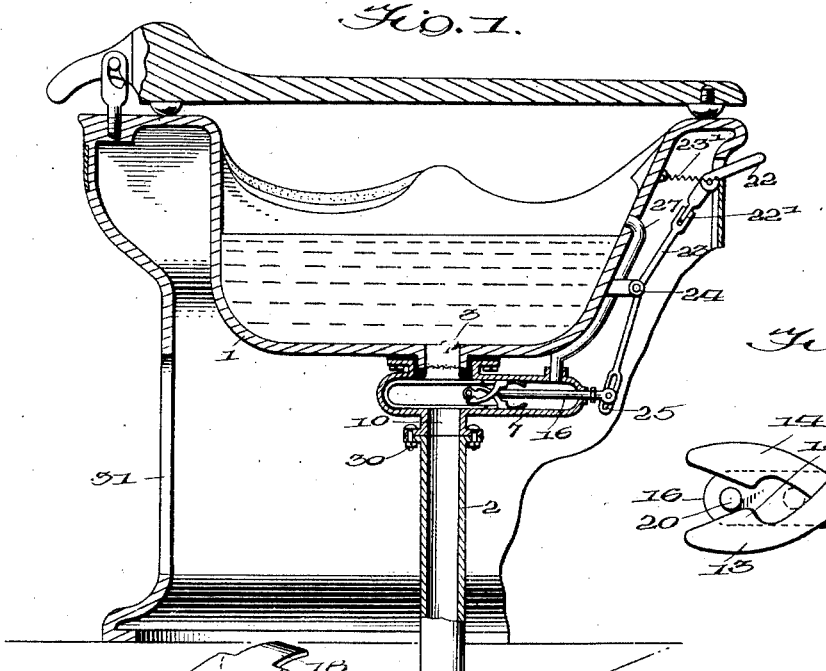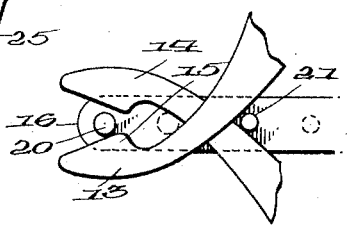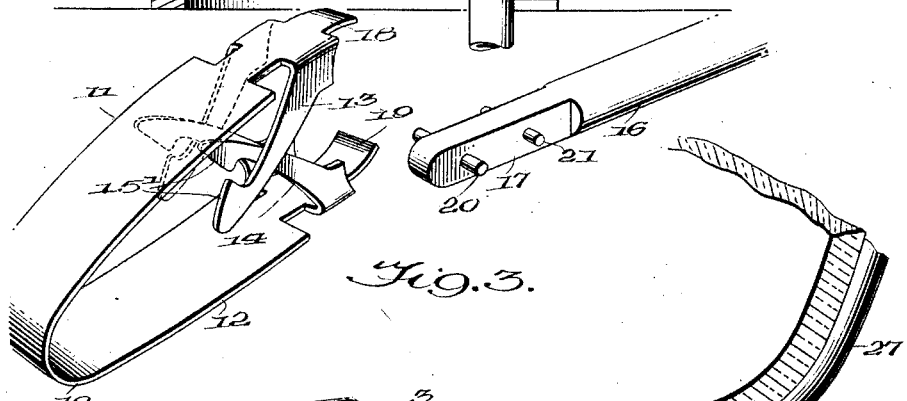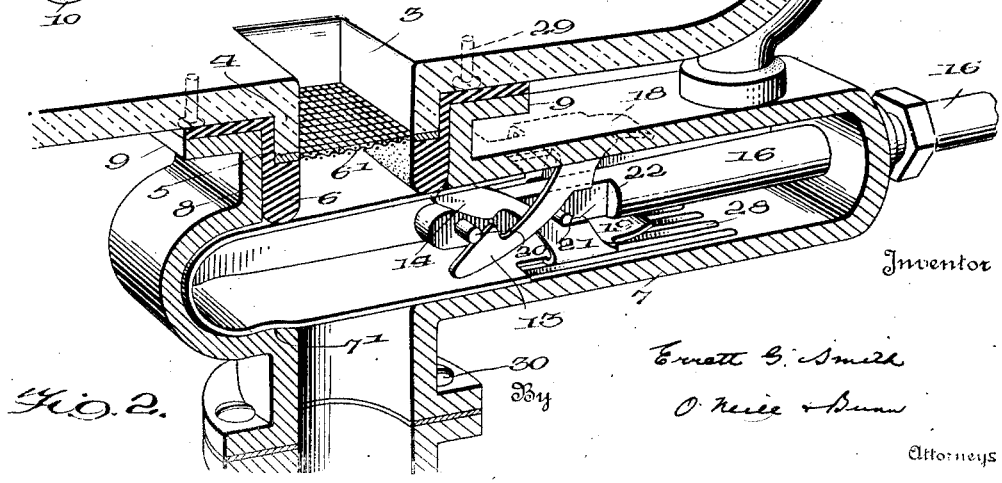

1,708,805

UNITED STATES PATENT OFFICE.

ERRETT G. SMITH, OF WASHINGTON, DISTRICT OF COLUMBIA.

VALVE INSTALLATION.

Original application filed January 24, 1928, Serial No. 249,043. Divided and this application filed June 26, 1928. Serial No. 288,388.

The present invention relates to valve installations and more particularly to slidably mounted valves adapted for movement to open or close a port defined by a valve seat.

In the present embodiment of the invention the valve is preferably formed of sheet metal possessed of an inherent resiliency which is utilized in effecting a tight seal against the valve seat when the valve is in its closed position, the object of the invention being the provision of a valve of the class referred to, which will resiliently bear against the valve seat when in closed position, in combination with means for moving said valve to and from its seat.

Another object of the invention is the provision of actuating mechanisms for said valve, equipped with means for decreasing a dimension of the valve when it is pushed towards its seat, and for increasing said dimension after said valve has been forced to its seat, thereby facilitating the operation of moving the valve, and insuring a tight joint between the latter and said seat.

The present invention is a division of my co-pending application, Ser. No. 249,043, "lavatory fixture", filed Jan. 24, 1928, and is here shown and described as applied to the fixture disclosed in said application, but it is to be understood that the invention is not limited to such specific usage.

Other objects of the invention will be made apparent in the following specification, when read in connection with the accompanying drawings forming a part thereof.

In said drawings:—

Fig. 1 is a section taken vertically through the basin or bidet described in my co-pending application referred to.

Fig. 2 is a sectional perspective view showing the valve in operative position.

Fig. 3 is a perspective view showing the valve closure element and its operating rod in unassembled position, and, Fig. 4 is a detailed side elevation of the ends of the curved fingers carried by the valve, and showing a portion of the valve operating mechanisms.

Now referring specifically to the drawings, in which like reference numerals indicate like parts throughout the several views, 1 indicates any basin or fixture adapted to receive a fluid, and equipped with an outlet drain pipe 2. The basin 1 is provided with an outlet port 3, preferably of rectangular conformation, to prevent whirling action of water in passing therethrough, the lower portion of the basin surrounding the outlet, being downwardly extended to form a squared chute 4, of the same inside dimensions as the port 3.

Surrounding the chute 4 is a valve seat, 5, preferably formed of relatively soft rubber. The seat 5 extends upwardly over the outside of the chute 4, and is tightly secured thereto, as will be hereinafter explained, the lower portion of the seat being positioned substantially below and in the vertical plane of the walls of the chute, and equipped with enlarged rubber heads 6, adapted for contact by the valve closure element, the top portions of said seat being adapted to fit against the lower surface of the bottom of the basin 1. The top portions of the heads 6 are flattened or shouldered, to support a screen 6'.

The valve housing comprises an elongated hollow casting 7, having an inlet in its top near its rear end, said inlet being defined by integral upstanding flanges 8, adapted to extend upwardly over the side walls of the seat 5, and horizontally extending flanges 9, parallel to the bottom of the basin 1. In actual practice I prefer to place the valve seat on the casting 7, before the latter is secured to the basin 1, and, in this process, the seat 5, having been molded to the proper size, is inserted into the inlet port of the casting 7, so that the lower edges of the heads 6 will project downwardly into the interior of the casting to a point just slightly below the lower surface of the top wall of the latter. In this position the sides and top of the seat may be adhesively or otherwise secured to the flanges 8 and 9 of the casting 7, if desired, and the screen 6' is laid upon the shoulders carried on the upper portion of the heads 6. The casting 7 is then placed in position as shown in Fig. 2, the flanges 9 being bolted or screwed to the bottom of the basin 1, and firmly retaining the casting and seat in proper assembled condition with respect to the port 3, the seat and its vertical walls, and its horizontal flanges, operating as packing gaskets preventing leakage.

Reciprocably mounted within the casting 7, is the valve element 10, as best illustrated in Fig. 2. It comprises two leaves 11 and 12 of spring metal integrally connected at the one end, and normally tending to assume the distended position shown in Fig. 3. The leaf 11 is provided at its front end, on each side, with integral, rearwardly and downwardly extending curved guide fingers 13, and the leaf 12 is also equipped with similarly shaped but upwardly extending guide fingers 14. In addition thereto all of the fingers are provided with hooks 15 on their rear edges, as shown in Figs. 2 and 3. Near the rear end of the floor of the casing 7, is an integrally formed elevated boss 7', adapted to cause flexure of the body, of the lower leaf 12, and cause the valve 10 to snap into and out of operative position, under the power of actuating mechanism to be described.

Mounted for sliding movement in an aperture formed in the front end of the casing 7, is a bar 16, here shown as round in cross-section. The bar extends into the valve casing through suitable packing, the flattened front end 17 thereof being entered between the free ends 18 and 19 of the leaves 11 and 12, respectively. Adjacent its inner end the bar 16 carries two circular pins 20 and 21, projecting from each side of the bar to a point adjacent the side walls of the casing 7, and the assembly is such that, on each side of the bar 16, a finger 13 and a finger 14 is entered between the pins 20 and 21, said fingers lying in substantial contact each to each, as best shown in Fig. 2, in which the valve is illustrated in its closed position. The pins 20 and 21 may be rotatively mounted in the bar, if desired, or provided with anti-friction devices.

The valve element 10 is here shown as actuated by a bell crank lever control 22, the inner end of said lever being pivoted at 22' to a connecting rod 23, the latter being pivoted in a bracket 24 secured to the basin 1, the rod 23 terminating in a loop 25 operatively secured to the end of the bar 16. As illustrated in Fig. 1 the valve 10 is in its closed position, the lever 22 having been raised. In this position, when it is desired to open the valve, the lever 22 will be depressed, thereby causing the loop 25 to move away from the casing, and exert a pull upon the outer end of the bar 16. Such pull will cause the pins 20 to ride along the inclines 15', 15', provided on the oppositely disposed edges of the ends of the hooks 15, 15, and to enter the sockets formed by said hooks, assuming the dotted line position shown in Figs. 2 and 4, in which position a continued pull on the rod 16 will cause said pins 20 to bear against the oppositely curved inner edges of the fingers 13 and 14, and force the leaves 11 and 12 together, thereby reducing the distance between the leaves, decreasing the pressure of the leaf 11 upon the seat 6, and facilitating the operation of drawing the valve from its seat. Continued pull on the bar 16 will cause the lower surface of the leaf 12 to ride over the boss 7', thereby relieving the pressure of the upper surface of the leaf 11 on the heads 6, and permitting easy movement of the valve to the front of the casting to allow the flow of water through the port 3. The fingers 14 are provided with ledges 22, adapted to receive the pin 21 and support the bar 16 in proper position.

To restore the valve to its closed position the lever 22 is raised, causing the pins 20 to bear against the front edges of the hooks 15, 15, and thereby forcing the leaves 11 and 12 together and relieving the friction on the leaves as they travel rearwardly in the casting. In the rearward movement of the valve 10 the rear end thereof is forced over the boss 7', and the valve will snap into position, the boss 7' causing the leaf 11 to be pressed tightly against the heads 6. In its closed position the rear end of the valve 10 is located adjacent the curved rear end of the casting 7. In this position the pins 21 are pressed forcibly against the front edges of the curved fingers 13 and 14, and tend to push apart the free ends of the leaves 11 and 12, the lever 22 preferably being connected to a spring 23', and being adapted to hold the pins 21 against said front edges of the fingers, the pins operating as a wedge to hold the spaced ends of the leaves apart. The pins 20, at this time, have been forced between the hooks 15, and are in the position shown in Figs. 2 and 4.

An over-flow pipe 27 leads from the basin 1 to the interior of the casting 7, and, in order to take off the over-flow therefrom, a plurality of grooves 28 are formed in the floor of the casting, and lead to the drain 2, as will be understood.

From the foregoing it will be noted that, while the leaves 11 and 12 are always exerting their resiliency to hold the leaf 11 against the heads 6, the actuating mechanism here disclosed is well adapted to first decrease the pressure of the leaf 11 upon the seat, and then move the valve to open position, and to later reduce the distance between the leaves and restore the valve to its seat. In actual manufacture the components are so designed that the raised boss 7' will cause the valve, in its movements, to snap into and out of its closed position as the rear end thereof rides over said boss.

Whenever it becomes necessary to renew the valve seat, or to make any repairs, the bolts 29 and 30 are removed, a door 31 being provided in the foundation of the basin here shown, to permit access of the operator.

Modifications of the structure shown herein may be suggested to those skilled in the art, but my invention covers all embodiments falling fairly within the scope of the appended claims.

I claim:—

1. A valve assembly including an elongated casing having an inlet and outlet port, a valve seat extending into said casing through said inlet port, a valve reciprocably mounted in said casing, said valve comprising two connected leaves of resilient material, one of said leaves being adapted to engage said seat, and means adapted to move said leaves together and to simultaneously reciprocate said valve in said casing.

2. A valve assembly comprising a casing and a seat extending thereinto, a valve movably mounted in the casing and comprising a pair of resilient leaves connected at one end and spaced at the other end, one of said leaves being adapted to engage the said seat and the other leaf being slidable along a wall of the casing, angularly extending fingers secured to the sides of each leaf, said fingers having curved front and rear edges, and operating mechanisms extending into said casing and provided with means for engaging the front and rear edges of said fingers, whereby a force exerted through said mechanisms may move the valve in said casing.

3. A valve of the class described comprising a member composed of two resilient leaves connected at one end and spaced at the other end, and angularly extending curved fingers carried by the side margins of each leaf.

4. A valve assembly including a casing and a valve seat extending thereinto, a valve reciprocably mounted in said casing, means for moving said valve in the casing and means for decreasing the friction on said valve during its movements to and from said seat.

5. A valve assembly including a casing and a valve seat extending thereinto, a valve reciprocably mounted in said casing, said valve being formed of two resilient leaves connected at one end and spaced at the other end, one of said leaves being adapted to engage said seat, and means for moving said valve in said casing, including members adapted to draw said leaves together during the movement of the valve in said casing.

6. A valve assembly including a casing and a valve seat extending thereinto, a valve reciprocably mounted in said casing, said valve being formed of two resilient leaves connected at one end and spaced at the other end, one of said leaves being adapted to engage said seat, and means for moving said valve in said casing, including members adapted to draw said leaves together during the movement of the valve in either direction in said casing.

7. A valve assembly including a casing and a valve seat extending thereinto, a valve reciprocably mounted in the casing and comprising two resilient leaves connected at one end and spaced at the other, one of said leaves being adapted to engage said seat, rearwardly projecting fingers carried by said leaves, and means for moving said valve in the casing, said means including members adapted for contact with said fingers and to draw said leaves together, under a force tending to move said valve in its casing.

8. A valve assembly including a casing and a valve seat extending thereinto, a valve reciprocably mounted in the casing and comprising two resilient leaves connected at one end and spaced at the other, one of said leaves being adapted to engage said seat, rearwardly projecting fingers carried by said leaves, and means for moving said valve in the casing, said means including members adapted for contact with said fingers and to draw said leaves together, under a force tending to move said valve in either direction in its casing.

9. A valve assembly including a casing and a valve seat extending thereinto, a valve reciprocably mounted in the casing and comprising two resilient leaves connected at one end and spaced at the other end, in combination with means for moving the valve in its casing and including members adapted to draw the leaves together during such movement.

10. A valve assembly including a casing and a valve seat extending thereinto, a valve reciprocably mounted in the casing and comprising two resilient leaves connected at one end and spaced at the other end, in combination with means for moving the valve in its casing and including members adapted to draw the leaves together during such movement in either direction.

11. A valve assembly including a casing and a valve seat extending thereinto, a valve reciprocably mounted in the casing and comprising two resilient leaves connected at one end and spaced at the other end, in combination with means for moving the valve in its casing and including members adapted to draw the leaves together during such movement, and an element adapted to thereafter spread said leaves and hold one of them tightly against said seat, when the valve has been moved to closed position.

In testimony whereof I affix my signature.

ERRETT G. SMITH.